United States Patent

[11] 3,628,088

[72] Inventor Larry J. Schmersal
 6220 Foxcroft, Toledo, Ohio 43615
[21] Appl. No. 851,131
[22] Filed July 18, 1969
[45] Patented Dec. 14, 1971

[54] HIGH-VOLTAGE INTERFACE ADDRESS CIRCUIT AND METHOD FOR GAS DISCHARGE PANEL
 8 Claims, 1 Drawing Fig.
[52] U.S. Cl. .................................................. 315/169 R,
 315/153, 315/156, 315/159
[51] Int. Cl. ....................................................... H05b 41/23
[50] Field of Search ........................................... 315/149,
 152-156, 159, 169; 250/208, 209

[56] References Cited
UNITED STATES PATENTS

| | | | |
|---|---|---|---|
| 2,123,459 | 7/1938 | Andersen ..................... | 315/153 |
| 2,170,167 | 8/1939 | Tarbox et al .................. | 315/153 X |
| 2,415,177 | 2/1947 | Hurley .......................... | 315/153 X |
| 3,037,144 | 5/1962 | LaMantia ..................... | 315/159 X |
| 3,459,943 | 8/1969 | Harnden ...................... | 315/156 X |

*Primary Examiner*—John Kominski
*Assistant Examiner*—E. R. La Roche
*Attorneys*—E. J. Holler and Donald K. Wedding ABSTRACT: There is disclosed an interface circuit for converting low-voltage logic signal voltage pulses to high-voltage discharge manipulating voltage pulses for a gas discharge display/memory device. The interface circuit is connected such that the output thereof is referenced to the sustaining voltage for the panel. An optical couple is used to isolate the low-voltage logic source from the high-voltage operating circuit. Consult the specification for further details.

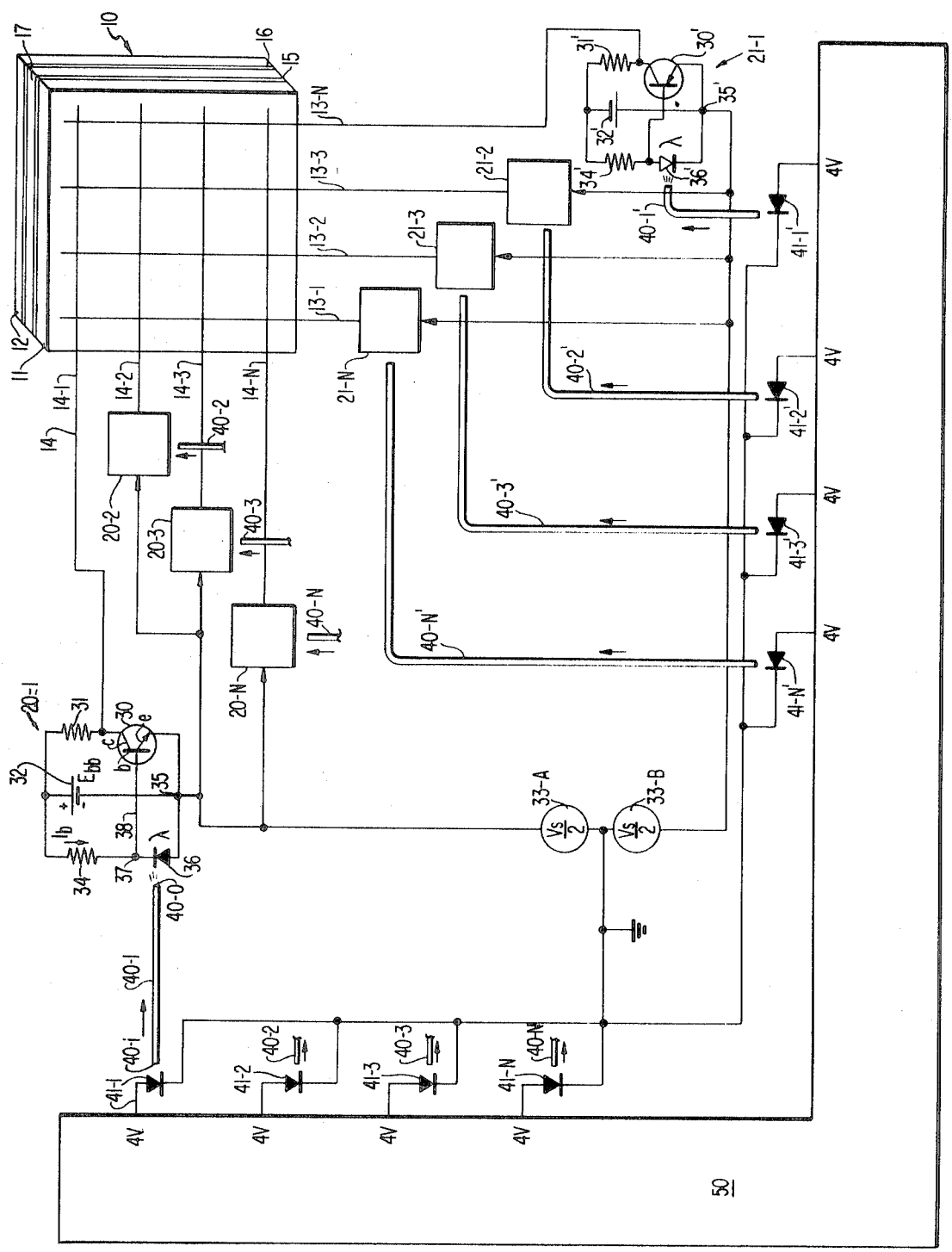

HIGH-VOLTAGE INTERFACE ADDRESS CIRCUIT AND METHOD FOR GAS DISCHARGE PANEL

Cross reference to related applications. The invention is related to the subject matter of Baker et al. application Ser. No. 686,384, filed Nov. 24, 1967, Nolan application Ser. No. 764,577, filed Oct. 2, 1968, Johnson et al. application Ser. No. 699,170, filed Jan. 19, 1968.

BACKGROUND OF THE INVENTION

Gas discharge panels and devices of the pulsing-discharge type e.g., discharges terminated by stored charges) require relatively high operating voltages, the magnitude of which depends upon, among other things, the discharge gap, gas mixture and pressure, thickness of the dielectric. For example the gas discharge panel disclosed in the above-referred Nolan application requires sustaining voltages between about 300 and 400 volts supplied to conductor matrices defining discharge sites. High-voltage pulses are added to such sustaining voltages at selected times to manipulate discharges at selected discharge sites. Command or information signals from a computer or other source of information to be displayed and/or stored are normally at a 4-volt level and such low voltages are of insufficient magnitude to manipulate the discharge condition of selected discharge sites. In the past, low-voltage command or address voltages from addressing logic circuits have been translated to voltage level sufficient to manipulate discharges and selected discharge sites by transformers driven by two transistors. Also, high-voltage transistor switches actuated by the low-voltage command voltages are used to connect a high-voltage direct current supply to conductors in the discharge site selection matrix. In such cases, the low-voltage circuitry may require additional components to assure isolation of the high-voltage supply from the low-level logic circuits.

SUMMARY OF THE INVENTION

In accordance with the present invention, isolation of the low-level command voltage source is achieved by a use of an optical couple. The low-level command signal (4 volts) is converted to a pulse of radiant energy such as light, which may be directly coupled, or, preferably, transmitted by a fiber optic element, to a light-sensitive transistor amplifier so that the low-level operating voltage, permitting different referenced grounds. Thus, the low-voltage system can be earth ground referenced whereas the light-sensitive amplifier can be referred to the high-level periodic voltage necessary to sustain discharge within the discharge device at a selected site, once initiated.

BRIEF DESCRIPTION OF THE DRAWINGS

The above and other features, aspects and details of the invention will become more apparent from the following specification when considered with the accompanying drawing illustrating a preferred embodiment of the invention.

DESCRIPTION OF A PREFERRED EMBODIMENT

With reference to the drawing, a gas discharge panel 10 of the type disclosed in Nolan application Ser. No. 764,577 is constituted by a pair of relatively rigid support or plate members 11 and 12, respectively, each of which has on opposing surfaces thereof conductor arrays 13 and 14, respectively, cooperatively defining discharge site locations and a pair of thin dielectric members 15 and 16, respectively, plate member 11 and 12 being joined together and sealed by spacer sealant member 17. The opposing surfaces of thin dielectric members 15 and 16 constitute at least in part a portion of storage member forming walls of a thin gas chamber under about 10 mils thick, and preferably the gas chamber is about 4 to 6 mils thick. Transversely oriented conductor arrays 13 and 14 are supplied with operating potentials for selectively effecting discharges within the this gas chamber between selected cross points or matrix points of a pair of the conductors of each array and sustaining and terminating discharges once initiated. The gas is one which is under a relatively high gas pressure so as to localize the discharges within the chamber and to confine charges produced on discharge to within the volume of gas in which they are created. As set forth in the aforementioned Nolan application, the gas in the thin gas chamber has a breakdown voltage versus discharge gap distance which is relatively horizontal over a selected broad range of gas pressure and, preferably is a mixture of neon and argon gases wherein the neon constitutes about 99.9 percent atoms of the gas mixture and the argon constitutes about 0.1 percent atoms of the gas mixture. The gas is under pressure of about 0.2 to about 5 atmospheres and preferably from about 0.2 to about 1 atmosphere.

As further disclosed in the aforementioned Baker et al. and Nolan applications, charges produced on discharge of the gas are collected upon the discrete surface areas of dielectric members 15 and 16 and in effect constitute electric potentials opposing the potentials which created them and hence terminate the discharge. However, on a succeeding half-cycle of applied potential, potential of the stored charges, being in the same direction, aid in initiating the next discharge and constitute an electrical memory. Because of the gas being at a relatively high pressure and separated from the operating conductors by dielectric material, relatively high periodic alternating potentials are required in order to sustain discharges once initiated. At the present time, typical sustaining voltage for a neon-argon panel lies within the range of 335 to 350 volts peak to peak at a frequency or rate of from about 30 to 50 kHz. with 2-microsecond high-voltage pulses superimposed or added to the sustaining voltage to manipulate the discharge condition of selected discharges sites The normal magnitude of pulse potential required to initiate a discharge (assuming, of course, that the gas has been conditioned by ultraviolet or by other means as disclosed in the aforementioned patent application) is about the same as the sustaining potential.

Normally voltages from a computer or standard commercially available logic circuitry is in a neighborhood of 4 volts. To interface such low-level signals with panels requiring voltages around 100 times larger is the problem with which the present invention deals.

As shown in the drawing, each conductor 14–1, 14–2, 14–3 ... 14–$n$ of conductor array 14 and each conductor 13–1, 13–2, 13–3, ... 13–$n$ of conductor array 13 is provided with its own drive circuit.

Each row conductor in conductor array 14 and each column conductor in conductor array 13 is provided with its own driving or interface circuit, which in the drawing are designated as 20–1, 20–2, 20–3 and 20–$n$ for row conductors 14–1, 14–2, 14–3, 14–$n$ respectively, and 21–1, 21–2, 21–3 and 21–$n$ for column conductors 13. It will be appreciated that panel 10 will usually have many more conductors and conductor arrays 13 and 14, presently available panels having the conductors on 30 mil centers so that in a 4-inch display area in a panel there may be about 132 row conductors and 132 column conductors.

Interface circuits 20 include a switching transistor 30 of the NPN-type having its collector C connected through resistor 31 to the positive terminal of a high-voltage direct current source 32 ($E_{bb}$) and its emitter E connected to the negative terminal of high voltage direct current source 32. In addition, a periodic voltage, as for example, a sinusoidal voltage ($Vs/2$) from a sustaining voltage generator 33–A is applied to the common terminal 35 or connection between the negative terminal of battery 32 and the emitter electrode of transistor 30. As will be described later herein, the sustaining voltage from sustaining voltage generator 33–A constitutes one-half the sustaining potential necessary to be applied across the gas in the discharge gap in the panel to sustain discharges once initiated. Oppositely phased sustaining voltage ($Vs/2$) from sustaining generator 33–B is applied to column conductors 13 through addressing pulse circuits 21.

Connected in parallel with the high-voltage direct current source 32 is a series circuit constituted by resistor 34 and photosensitive diode 36, the anode of diode 36 being connected to the common circuit point 35 for emitter electrode of transistor 30, the negative terminal of high direct current source 32 and the connection from sustaining generator 33–A. The common point 37 between resistor 34 and photosensitive diodes 36 is connected by a lead 38 to the base of transistor 30.

When photosensitive diode 36 is not illuminated, the resistance thereof is in the megaohm range and all of the current $Ib$ enters the base $b$ of transistor 30 turning this transistor on. Thus, the output voltage appearing at the collector of transistor 30 is essentially the sustaining voltage ($Vs/2$) from the sustaining generator 33a, passed by transistor 30.

Photosensitive diode 36 receives signal inputs in the form of burst of radiant energy, such as light, from a light-bearing fiber optic element 40, photosensitive diode 36 being in close optically coupled relation to the output end 40–0 of fiber optic element 40. The input end 40–I of light-bearing fiber element 40 is in close optically coupled relation with respect to light-emitting diode 41, there being a light-emitting diode 41 and fiber optic element 40 corresponding to each circuit 20 with the cathodes thereof commonly connected together and to the common system ground. Any 4-volt pulse as, for example, a 4-volt logic pulse from logic-addressing circuit 50 causes the light-emitting diode to which it is applied to emit light. Such light is coupled by a fiber optic element 40 to photosensitive diode 36 to cause the resistance thereof to drop from in the megaohm range to about 10,000 ohms which then causes the current $Ib$ to flow to ground through photosensitive diode 36. As a result, transistor 30 is turned off and the output voltage rises to the potential of high-voltage direct current source 32 added to the sinusoidal voltage from sustaining voltage generator 33–A. Thus, this output voltage now consists of a sine voltage plus an additive voltage e.g., ($Vs/2$)+$E_{bb}$). When the diode 41 is pulsed by 4-volt logic signals, then the output voltage $Vs/2$ will also have pulses added thereto of a magnitude essentially equal to source 32.

As noted earlier, the sustaining voltage sources 33–A and 33–B produce oppositely phase sustaining voltages so that one-half the required sustaining voltage is applied to column conductors 13 and one-half the required sustaining voltage is applied to row conductor 14. In order to accommodate this arrangement, pulsing circuit 21 utilizes PNP-transistors 30', and opposite polarity high-voltage direct current source 32' as well as an oppositely poled photosensitive diode 36', and except for this reversal of polarity, the operating principles are identical, it being understood that logic signal voltages applied to light-sensitive diodes 41 are applied simultaneously to selected pairs of conductors, the crossing points of which define a selected discharge site which it is desired to manipulate the discharge condition thereof.

It will be appreciated that other than sinusoidal voltages may be used to supply sustaining potentials. For example, alternating polarity square waves may be used in place of a sine wave. It will also be appreciated that signal produced at the base of transistor 30 may be used to switch a current pulse through a transformer primary to induce high voltages in the secondary thereof, the secondary being connected in series with a source of sustaining voltage as shown in application Ser. No. 699,170.

A feature of the circuit is that a 4-volt pulse, referenced to ground, may be used to control a very high-voltage (300 volt) pulse that is referenced to or floats on a sine waveform or other periodic waveform. The fiber optic elements effectively isolates the two signals such that a 300-volt signal does not couple back into the 4-volt system. In addition, there are fewer components per interface circuit and, obviously, since transistor 30 is conducting when it is not pulsed, the line impedance is reduced thereby reducing crosstalk between matrix conductors. In the circuit disclosed, the high-voltage pulsing circuit is isolated from the source of control signals via the optical coupling but other forms of isolation may be used so as to permit the pulse signals to be referenced to the sustaining voltage.

What is claimed is:

1. For use with gas discharge devices of the type in which a thin gas discharge medium under pressure and bounded by dielectric charge storage members has selected discharge sites in the gas manipulated on and off by relatively high-voltage pulses selectively added to a periodic sustaining voltage from a sustaining voltage source constituted by a pair of sources having a common reference point therebetween, through a transverse pair of matrix conductor arrays, respectively, said transverse pair of matrix conductor arrays defining the discharge sites and wherein voltages from a relatively low-voltage command voltage pulse source determines application of said selectively applied relatively high-voltage pulses, the improvement comprising, means for converting said low-voltage pulse to a pulse of radiant energy, and a high-voltage direct current source, electronic switch means responsive to said pulse of radiant energy for connecting said high-voltage source to matrix conductors defining a selected discharge site and in series relation with respect to one of said sustaining voltage sources, respectively.

2. The invention defined in claim 1 wherein said radiant energy is light and including an optical couple between said means for converting and said switch means for transmitting and applying the light to said switch means.

3. The invention defined in claim 2 wherein said means for converting includes a light-emitting diode and said optical couple includes a light-bearing fiber optic element.

4. The invention defined in claim 1 wherein said switch means includes:

radiant energy responsive impedance element positioned to receive said pulse of radiant energy, said high-voltage source being a direct current voltage having a magnitude of potential corresponding substantially to the relatively high-voltage pulses to be added to said sustaining voltage, a transistor, resistor means connecting the emitter-collector circuit of said transistor across said high-voltage source, means connecting the base electrode of said transistor to said radiant energy responsive impedance element, whereby on the absence of radiant energy on said radiant energy responsive impedance element said transistor is rendered conductive and the presence of radiant energy on said radiant energy responsive element renders said transistor nonconductive to cause the potential of said high-voltage source to be added to said periodic voltage.

5. A circuit for supplying operating potentials to a gas discharge device of the type in which a thin gas discharge medium under pressure, and bounded by dielectric charge storage members, has the discharge condition of selected discharge sites therein manipulated by selectively applied high-voltage pulses added to a relatively high periodic sustaining voltage through a pair of transverse conductor arrays defining the discharge sites and wherein voltages from relatively low-voltage signal pulse source determines application of said selectively applied relatively high-voltage pulses, the improvements comprising:

a plurality of circuits for converting a relatively low-voltage signal pulse to a relatively high-voltage pulse, each said circuit for converting a relatively low-voltage signal pulse to a relatively high-voltage pulse at a remote point comprising:

a light-emitting diode, means connecting said light-emitting diode to said low-voltage signal pulse to produce a pulse of light, a light-bearing fiber optic element having an input end and an output end, with said input end positioned to receive light emitted by said emitting diode, a photosensitive diode positioned to receive light issuing from said output end of said light-bearing fiber element, the dark impedance of said photosensitive diode being very high, a relatively high direct current voltage source, a transistor having emitter, collector, and base electrodes, means including a first resistor for connecting the emitter-collector circuit of said transistor across said high direct current voltage source, means including a series resistor for connecting said photosensitive diode across said direct current voltage source, means connecting a point intermediate said series resistor and said photosensitive diode to the base electrode of said transistor, whereby in the absence of light on said photosensitive transistor base current flows through said transistor rendering said transistor conductive and in the presence of light on said photosensitive diode the impedance thereof is low and current flows through same and said transistor is rendered nonconductive, and an output terminal connected to said first resistor on which appears the high direct current voltage from said high direct current source appears when said transistor is rendered nonconductive, and means connecting said output terminal to at least one conductor in one of said arrays, a source of said relatively high periodic sustaining voltage, and means commonly connecting said source of relatively high periodic sustaining voltage to a terminal of said relatively high direct current source, whereby when said transistor in one of said circuits in conducting said source of periodic sustaining voltage is connected to said output terminal and when said transistor is nonconducting said source of periodic sustaining voltage is connected in series with said relatively high direct current voltage source, appears at said output terminal with said voltage from said high direct current source.

6. In a system for supplying operating potentials to a gas discharge panel device of the type in which a thin gas discharge medium under pressure and bounded by dielectric charge storage members has the discharge condition of selected discharge sites therein manipulated by selectively applied high-voltage pulses and discharges maintained once initiated by a pair of relatively high, periodic sustaining voltages from a pair of sources by means of a pair of transverse row and column conductor arrays defining the discharge sites and wherein voltages from a relatively low-voltage signal pulse source determine the occurrence of said high-voltage pulses, the improvement comprising, each said source of sustaining potential having a pair of output terminals, respectively, and means connecting one of said terminals from each source of sustaining potential to each other and a point of common potential so that said relatively high sustaining voltage sources being connected to conductors of said array respectively such that said panel floats with respect to a point of common potential, at least a pair of opposite polarity high-voltage pulse generator means for the row and column conductor arrays, respectively, means connecting one said high-voltage generator means in series between one of said pair of sources of periodic sustaining voltage and the row conductors of said panel and the other of said high-voltage pulse generator means in series between the other of said pair of sources of periodic and sustaining voltage, means for applying said relatively low-voltage signal pulses to respective ones of said high-voltage pulse generator means to cause said high-voltage generator means to generate high-voltage pulses having as a reference point the magnitude of said voltage periodic voltage from the one of said pair of sources it is connected with in series relation.

7. The invention defined in claim 6 wherein said means for applying said relatively low-voltage signal pulses to said high-voltage pulse generator includes means for isolating the low-voltage signal source from said high-voltage pulse generator.

8. The invention defined in claim 7 wherein said means for isolating includes an optical couple.

* * * * *